Sept. 9, 1924.
D. JORDAN
ONE-MAN MOWER CONTROL
Filed July 2, 1923    2 Sheets-Sheet 2
1,508,279
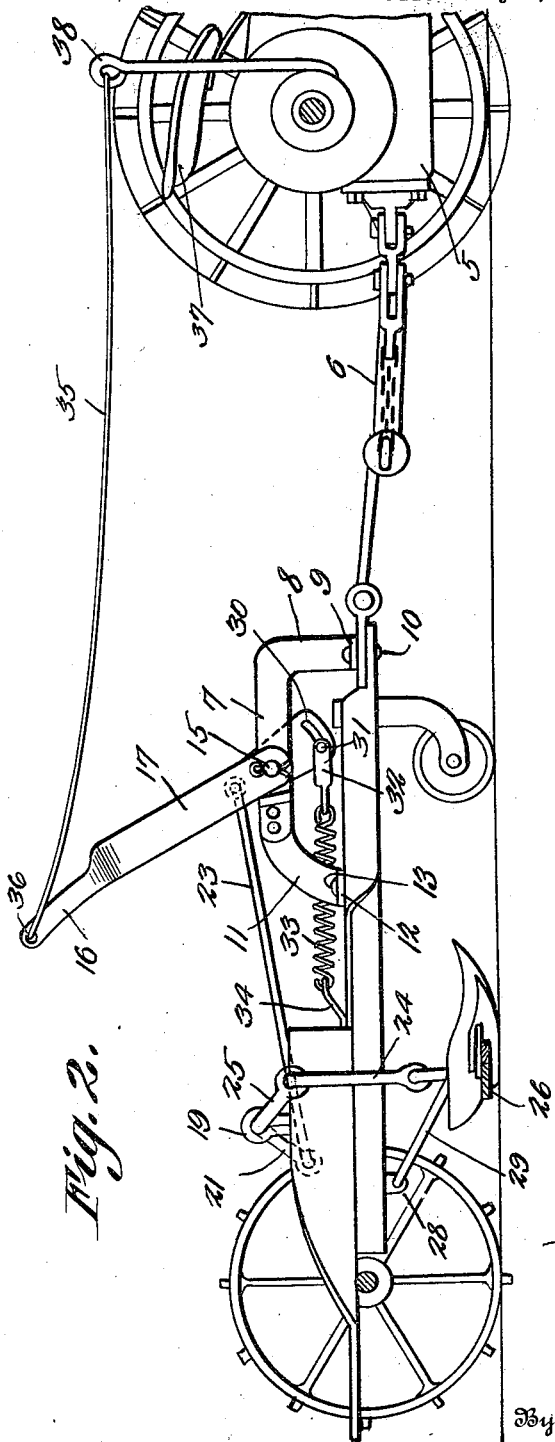
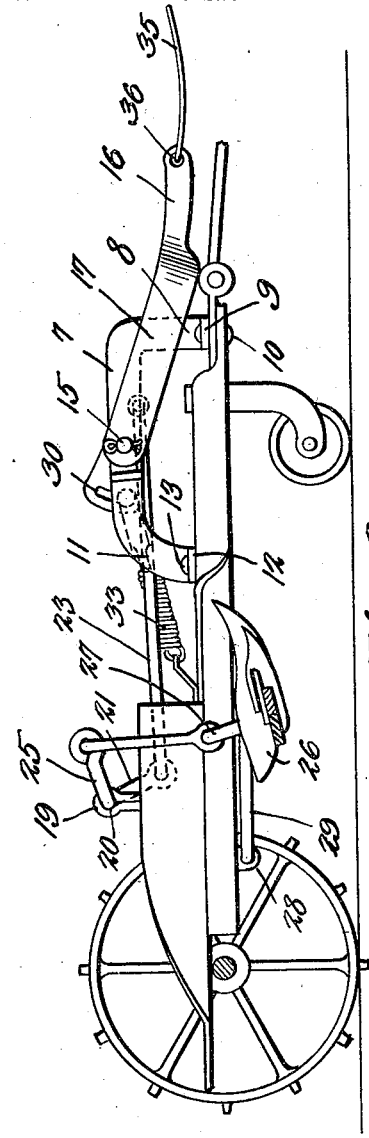
Daniel Jordan
Inventor
By C. A. Snow & Co.
Attorneys Patented Sept. 9, 1924.

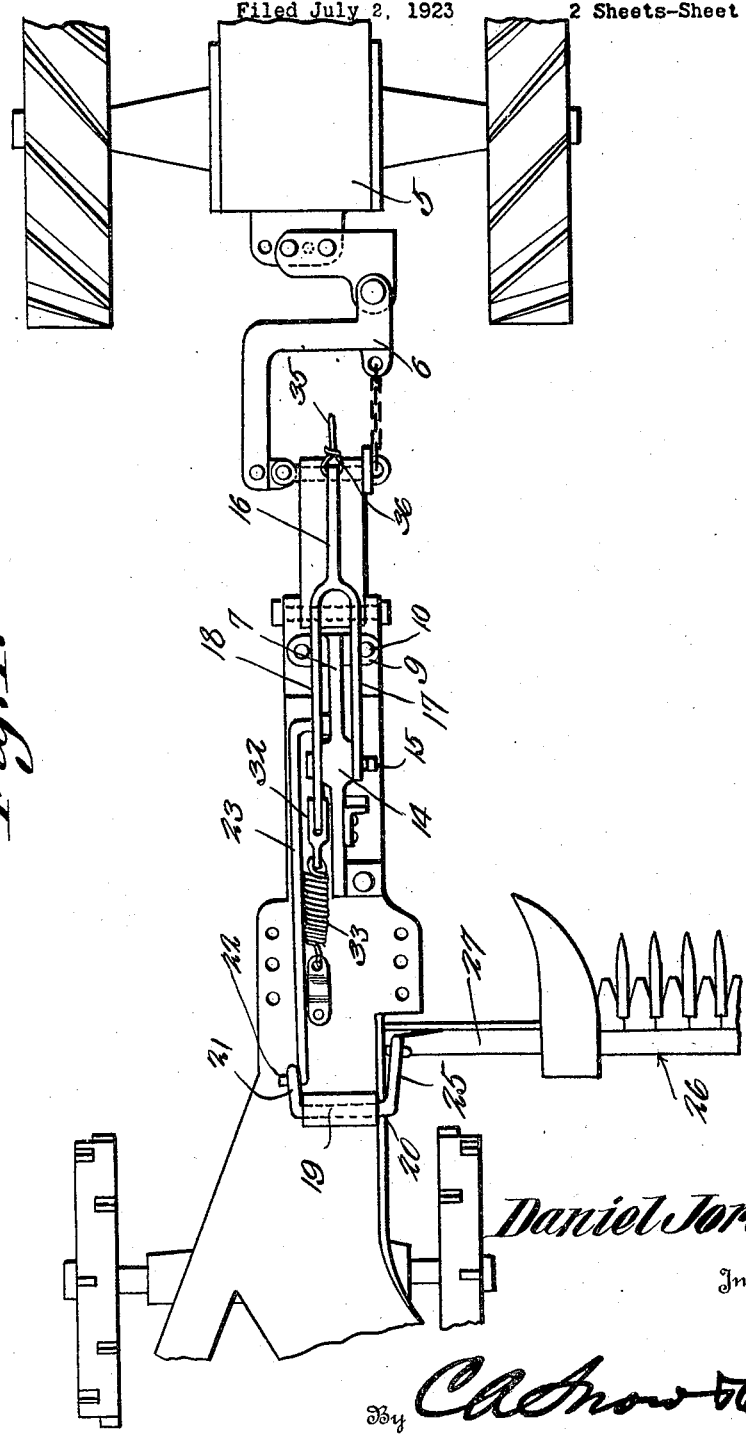

1,508,279

UNITED STATES PATENT OFFICE.

DANIEL JORDAN, OF HARRISON, NEBRASKA.

ONE-MAN MOWER CONTROL.

Application filed July 2, 1923. Serial No. 649,066.

*To all whom it may concern:*

Be it known that I, DANIEL JORDAN, a citizen of the United States, residing at Harrison, in the county of Sioux and State of Nebraska, have invented a new and useful One-Man Mower Control, of which the following is a specification.

This invention relates to a mower controlling device especially designed for use in connection with tractor mowers.

The primary object of the invention is to provide means for raising and lowering the cutter bar of the mower from a point remote from the mower.

An important object of the invention is to provide novel means for locking the controlling lever against movement after the lever has been operated.

Another object of the invention is to provide a device of this character which may be readily and easily supplied to the usual mower construction, eliminating the necessity of making extensive alterations in the usual mower construction to install the device.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view disclosing a mower supplied with an operating device constructed in accordance with the invention.

Figure 2 is a side elevational view thereof, showing the operating lever moved to allow the cutter bar to rest on the ground surface.

Figure 3 is an elevational view disclosing the lever moved to elevate the cutter bar.

Referring to the drawings in detail, the reference character 5 designates the rear end of a tractor of the one-man type to which the mower is hitched.

The operating device forming the essence of the present invention embodies a supporting arm 7 which has a right angled end portion 8 formed with laterally extending ears 9 provided with openings to receive the securing bolts 10 providing means to secure the bar to the mower construction.

The opposite end of the bar 7 curves downwardly as at 11 where the same is provided with a right angled extremity 12 apertured to receive the bolt 13. Intermediate the ends of the bar 7 is an enlargement 14 provided with lateral pintles 15 on which the operating arm 16 is pivotally mounted. This arm 16 is formed integral with the spaced arms 17 and 18 which have openings to receive the pintles 15, the arm 18 being relatively long as compared with the arm 17 so that the free end thereof extends to a position below the lower edge of the bar 7.

Secured to the motor proper is a bearing 19 in which the rod 20 is supported, the inner end of the rod being formed into a right angled extension 21 having an eye to accommodate the right angled extremity 22 of the connecting rod 23.

As shown, the connecting rod 23 has its forward end positioned in an opening of the arm 18 at a point in spaced relation with the pintles 15 so that when the arm 16 is moved to its locking position as shown by Figure 3 of the drawing, the connection between the rod 23 and arm 18 will lie in a plane below the pintles 15 and held in such position, by means of the weight of the cutter bar which is indirectly operated thereby.

Link 24 has connection with one end of the rod 20 which is formed with an offset end portion 25, whereby movement of the rod results in a relative movement of the end portion 25 causing the link 24 to move vertically. Extending upwardly from the cutter bar 26 is an arm 27 formed with an eye to accommodate the lower end of the link 24, whereupon movement of the link 24 will act to elevate the cutter bar 26.

A bearing member is indicated at 28 and receives one end of the pivot rod 29 that has its opposite end pivotally connected to the cutter bar, allowing pivotal movement of the cutter bar, but restricting rearward movement thereof while the same is in operation.

Formed in the lower end of the arm 18 is a curved slot 30 in which the bolt 31 is positioned, which bolt is carried by the connection member 32 that has an opening to receive the forward end of the coiled spring 33. The opposite end of the coiled spring 33 is anchored to the mower by means of the plate 34 so that when the operating bar 16 is moved to lower the cutter bar 26, the spring will be placed under tension to assist the operator in moving the operating bar 16 to elevate the cutter bar and throw the same out of operation.

A flexible operating member is indicated at 35 and has one end connected to the free end of the operating arm 16, at 36, the opposite end thereof being tied to the upper end of the supporting arm 36 thereby holding the flexible operating member in a position where the same may be readily and easily operated by the person seated on the seat 37.

From the foregoing it will be obvious that by exerting a slight pull on the flexible member 35, when the arm 16 is in a position as shown by Figure 2 of the drawing, the spring will, when the arm has been moved forwardly beyond a vertical line through the pintles 15, move the arm 16 to a position as shown by Figure 3 of the drawing.

It is obvious that when the flexible member 35 is pulled, and the arm 16 is in a position as shown by Figure 3 of the drawing, the arm will be moved upwardly by the weight of the cutter bar, after the arm 16 has passed the central line of gravity.

What is claimed as new is:—

A cutter bar operating device for mowers, including a supporting member, an arm pivotally mounted on the supporting member, a rod associated with the supporting member and disposed at the rear thereof, said rod having right angled ends, pivoted means for connecting one of the right angled ends to a cutter bar, a connecting rod for connecting the opposite right angled end of the rod to the operating arm, said arm having a slot formed therein, a coiled spring having one end anchored remote from the arm, means disposed in the slot and having connection with the spring to expand the spring when the arm is moved to lower the cutter bar, and said spring being adapted to assist in returning the arm to its normal position.

In testimony that I claim the foregoing as my own, I have hereto affixed my signature in the presence of two witnesses.

DANIEL JORDAN.

Witnesses:
J. H. WILLIEMSDORF,
Mrs. WM. D. NEWELL, Jr.